United States Patent
Gustafson

[11] 3,844,043
[45] Oct. 29, 1974

[54] DEVICE FOR SCALING ANGLES

[76] Inventor: Ray Gustafson, Box 136, Trimont, Minn. 56176

[22] Filed: Oct. 15, 1973

[21] Appl. No.: 406,652

[52] U.S. Cl. .................................................. 33/91
[51] Int. Cl. ............................................. B43l 7/06
[58] Field of Search ........................................ 33/91

[56] References Cited
UNITED STATES PATENTS

| | | | |
|---|---|---|---|
| 467,852 | 1/1892 | Buckelew | 33/91 |
| 963,274 | 7/1910 | Bundy | 33/91 |
| 1,658,742 | 2/1928 | Ryan et al. | 33/91 |
| 2,866,270 | 12/1958 | Johnson et al. | 33/91 |

Primary Examiner—Harry N. Haroian

[57] ABSTRACT

A tool for gauging either internal or external angles, and transferring the angle to building material. A pair of gauge arms fits the angle and is held at that angle by means of a slide mechanism attached to said gauge arms by means of pivoting levers. Clamping and frictional loading of the slide mechanism is also provided.

2 Claims, 3 Drawing Figures

PATENTED OCT 29 1974 3,844,043
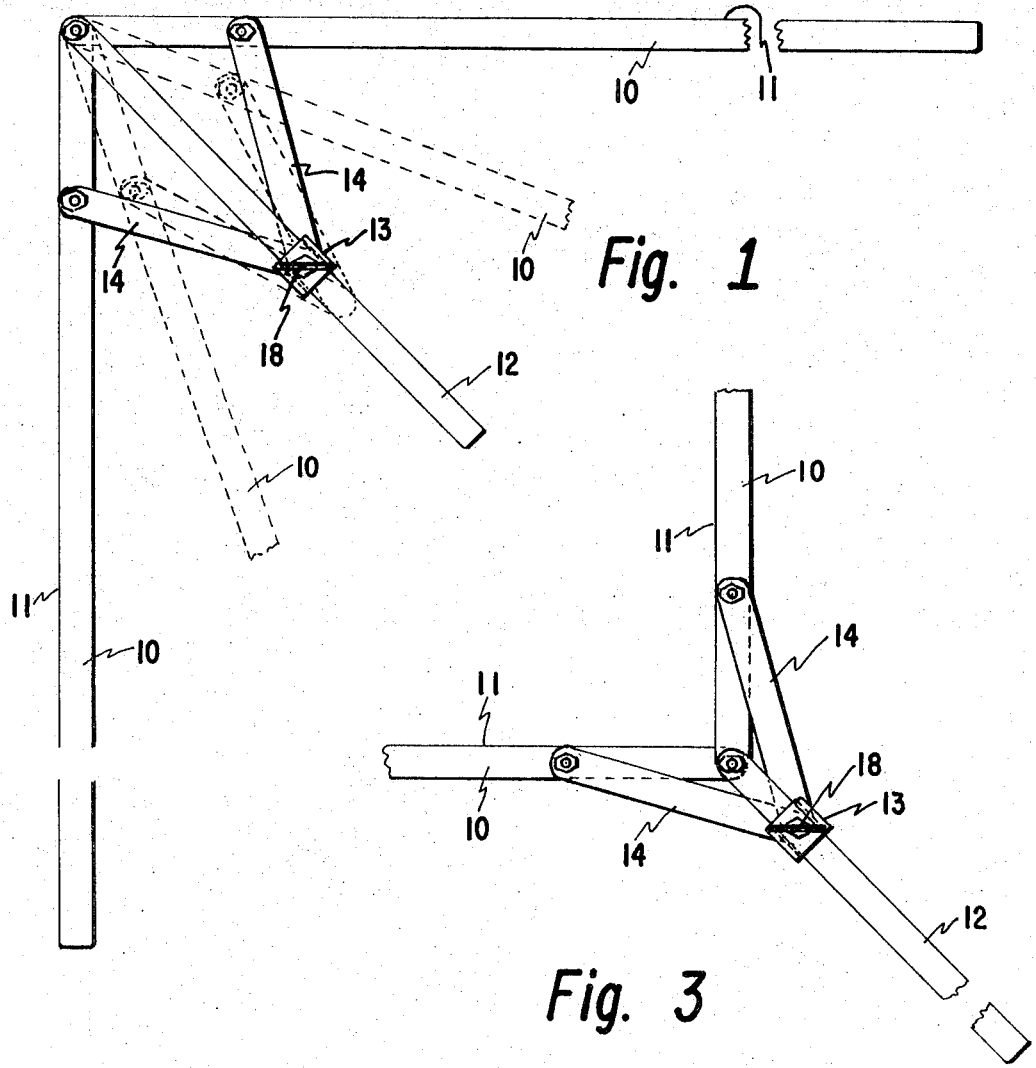
Fig. 1
Fig. 3
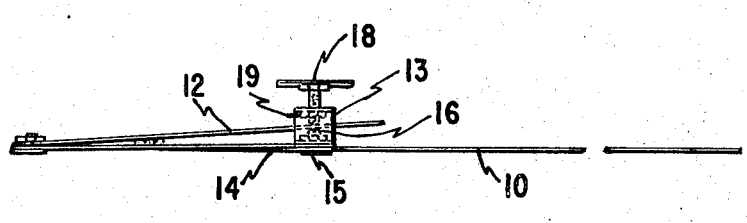
Fig. 2

DEVICE FOR SCALING ANGLES

BACKGROUND AND SUMMARY OF THE INVENTION

This invention pertains to gauges for angles either internal or external, and more particularly to such a gauge which can be adjusted to any angle and then transfer that angle to a piece of building material such as plywood or wallboard, or to a decorating materials such as wallpaper.

In the remodeling or redecorating, particularly of older buildings and on stairways or sloping areas, it is often highly desirable to know the exact angle of wall to ceiling or between walls so that wallboard or paneling can be cut accurately to fit. This is true both of inside angles on conrers of a room and of exterior angles where there are projections into a room.

Previously, these angles have been measured by eye, or by scribing lines parallel to the slope or other similar expedients.

By my device, I can provide a nearly exact gauging of the angle, can hold the angle indefinitely in the gauge and transfer it to the material to be cut with considerable accuracy so that trimming and fine cutting can be virtually eliminated.

FIGURES

FIG. 1 is a plan view of my device set to gauge an interior angle,

FIG. 2 is an edge view of my device to show the spring drag and clamping mechanism, and FIG. 3 is a plan view showing my device set to measure an exterior angle.

DESCRIPTION

Briefly my device consists of a pair of arms adapted to fit the edges of an angle to be gauged. Clamping means consisting of a slide arrangement attached to the arms by pivoted links and adapted to be clamped in a fixed position.

More specifically and referring to the drawings, my device consists principally of the gauge arms 10 pivoted together at one end. These arms have flat outer edges 11 which may be placed against the surfaces of any angle in any building.

A slide rod or arm 12 is also pivoted to the gauge arms 10. In plan view this arm lies between the gauge arms as shown in FIGS. 1 and 3. However, from the edge (FIG. 2), it can be seen that the slide arm does not lie between the gauge arms 10 at the pivot point, but rather lies on one side of the pair actually above the two gauge arms. The purpose of this construction will appear hereinafter.

A clamping slide 13 is slidably mounted on the arm 12. A pair of links 14 pivotally connected to the gauge arm 10 and pivoted to the slide 13 provides means by which the arms 10 may be fixed in position. Preferably, the links are pivoted to the bottom of the slide 13 by means of a screw or a rivet 15 having a raised or exposed portion 16 within the slide. The links 14 are also preferably pivoted on the upper side of the gauge arms 10. Thus there is a tendency for the slide to extend above the arms 10. This will allow the tool to be set on a flat piece of wallboard or the like with little or no spacing between that board and any part of the gauge arms 10. In other words, the tool can be set nearly flat on the material.

A clamping screw 18 which may be a thumb screw or the like is provided by which the arm 12 may be clamped in place. The screw 18 may be threadably engaged with the slide, or may be provided with a nut 19 cages in the slide 13 so that it will not turn relative thereto so that the thumb screw can be screwed tight. The end of the screw 18 is directed in opposition to the exposed portion 16 of the pivot screw or rivet so that clamping is relatively positive.

In use, the screw 18 is loosened so that the arms 10 are free to move. They are fitted to whatever angle is to be gauged. This may be the angle between two walls where a piece of material is to be placed on a ceiling or floor, or it may be the angle between a wall and ceiling as in a stairway, or even in a room where the walls and ceiling were not perpendicular such as a room with a deliberately sloped ceiling. The angle could also be a supposed square corner which might not be quite square because of the settling of the building, minor errors in the original construction or the like.

It will be noted that while setting the arms 10, the arm 12 will slide through the slide 13. Because of the raised end 16, the arm 12 will be slightly bent or displaced causing a springlike pressure on the end 16. Thus a certain amount of friction is always present so that the arms 10 will stay in place while the screw 18 is clamped to hold the angle positively.

After clamping the gauge to the fixed angle, the tool can be set down flat on the material to be cut to fit and the material scribed along the edges 11 of the blades 10. The scribed line will then show the angle to be cut to provide a proper fit.

As shown in FIG. 3, the device can be used to gauge outside angles as well as interior angles. This feature is useful in cutting materials to be used around surfaces projecting into rooms.

I claim:

1. A device for gauging angles comprising a slide arm, a pair of gauge arms pivoted at a common point to one end of said slide arm, slide means slidably disposed on said slide arm, said slide means including clamping means to clamp said slide means releasably in a given position on said slide arm, link means pivotally connected to said gauge arms on an upper surface of the gauge arm, said link means also being pivotally connected to a lower surface of said slide means, said slide means being thereby vertically displaced from said gauge arms, said slide arm being of normally flat material whereby the vertical displacement causes a frictional engagement between said slide means and said slide arm.

2. The device of claim 1 in which projecting means within said slide means projects upward beneath said slide arm and said slide arm is formed of resilient material whereby the resilience of said slide arm presses said slide arm onto said projecting means causing friction which resists movement of said slide means or said slide arm.

* * * * *